United States Patent
de Hoog et al.

(10) Patent No.: US 11,557,013 B2
(45) Date of Patent: Jan. 17, 2023

(54) PERSONALIZED VENUE EVACUATION PLAN

(71) Applicant: International Business Machines Corporation, Armonk, NY (US)

(72) Inventors: Julian de Hoog, Greensborough (AU); Leon Gouletsas, South Yarra (AU); Laurence John Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/412,534

(22) Filed: May 15, 2019

(65) Prior Publication Data

US 2020/0364819 A1 Nov. 19, 2020

(51) Int. Cl.
  *G06Q 90/00* (2006.01)
  *G06F 16/29* (2019.01)

(52) U.S. Cl.
  CPC ........... *G06Q 90/205* (2013.01); *G06F 16/29* (2019.01)

(58) Field of Classification Search
  CPC .... G06Q 90/205; G06Q 90/20; G01C 21/206; G01C 21/3415; H04W 4/90; G01S 19/17; G08B 7/062; G08B 7/066; G06F 16/29; G06F 3/048
  See application file for complete search history.

(56) References Cited

U.S. PATENT DOCUMENTS

| | | | |
|---|---|---|---|
| 8,624,727 B2 | 1/2014 | Saigh et al. | |
| 9,464,907 B1* | 10/2016 | Hoareau | G01C 21/3632 |
| 9,582,841 B2 | 2/2017 | Klein et al. | |
| 9,681,280 B2 | 6/2017 | Balthasar et al. | |
| 10,026,278 B1 | 7/2018 | Asaro et al. | |
| 2006/0195356 A1 | 8/2006 | Nerenhausen et al. | |

(Continued)

FOREIGN PATENT DOCUMENTS

| | | |
|---|---|---|
| CN | 101795395 A | 8/2010 |
| CN | 105704434 A | 6/2016 |

(Continued)

OTHER PUBLICATIONS

Lujak, Marin, et al. "A distributed architecture for real-time evacuation guidance in large smart buildings." Computer Science and Information Systems 14.1 (2017): 257-282. (Year: 2017).*

(Continued)

*Primary Examiner* — Liang Y Li
(74) *Attorney, Agent, or Firm* — Mark Bergner (57) ABSTRACT

A method may include obtaining a first data set of a first user present at a venue. The method may also include obtaining venue characteristic data corresponding to a set of characteristics of the venue. The method may also include obtaining first venue condition data corresponding to a first set of venue conditions. The method may further include generating a first evacuation route based at least in part on the first data set. The method may also include generating a first timing instruction corresponding to the first evacuation route and based at least in part on the first venue condition data. The method may further include providing the first evacuation route and the first timing instruction to the first user.

17 Claims, 6 Drawing Sheets

(56) References Cited

U.S. PATENT DOCUMENTS

| | | | |
|---|---|---|---|
| 2007/0194922 A1* | 8/2007 | Nathan | A62B 99/00 |
| | | | 340/572.1 |
| 2008/0118106 A1 | 5/2008 | Kilambi et al. | |
| 2013/0183924 A1 | 7/2013 | Saigh et al. | |
| 2016/0269882 A1 | 9/2016 | Balthasar et al. | |
| 2016/0314554 A1* | 10/2016 | Pillac | G01C 21/3407 |
| 2017/0024839 A1 | 1/2017 | Klein et al. | |
| 2017/0053503 A1* | 2/2017 | Pal | G06Q 90/205 |
| 2017/0176190 A1* | 6/2017 | Harvey | G01C 21/206 |
| 2017/0243316 A1* | 8/2017 | Pal | G06F 17/11 |
| 2017/0261959 A1* | 9/2017 | Kuusinen | B66B 3/00 |
| 2017/0316538 A1* | 11/2017 | Tadano | G01C 21/3415 |
| 2018/0204428 A1 | 7/2018 | Asaro et al. | |
| 2019/0027015 A1* | 1/2019 | Hsu | G08B 7/066 |
| 2019/0066464 A1* | 2/2019 | Wedig | H04W 4/33 |
| 2020/0175639 A1* | 6/2020 | Sabripour | H04W 4/30 |
| 2020/0334784 A1* | 10/2020 | Borsos | H04W 4/90 |

FOREIGN PATENT DOCUMENTS

| | | |
|---|---|---|
| CN | 106454233 A | 2/2017 |
| CN | 107231413 A | 10/2017 |

OTHER PUBLICATIONS

Lujak et al., "A Distributed Architecture for Real-Time Evacuation Guidance in Large Smart Buildings," Computer Science and Information Systems 14(1):257-282, DOI: 10.2298/CSIS161014002L, Received: Oct. 14, 2016, Accepted: Jan. 10, 2017, 26 pages.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

PERSONALIZED VENUE EVACUATION PLAN

BACKGROUND

The present disclosure relates to safety instruction, and more specifically, to guidance for navigating to safety.

Incidents may give rise to a need to evacuate a venue, and information may be provided to facilitate evacuation. For example, some venues have incorporated a set of signs or a group of personnel to assist with evacuations. In another example, technology has been developed that permits users to plan evacuations with mobile devices. Other relevant technology includes systems that can monitor crowd quantity, density, and flow direction, as well as systems capable of warning of potential crowd congestion based on monitored crowd data.

SUMMARY

Some embodiments of the present disclosure can be illustrated as a method including obtaining a first data set of a first user. The first user may be present at a venue. The method may also include obtaining venue characteristic data. The venue characteristic data may correspond to a set of characteristics of the venue. The method may also include obtaining first venue condition data. The first venue condition data may correspond to a first set of venue conditions. The method may further include generating a first evacuation route. The first evacuation route may be based at least in part on the first data set. The method may also include generating a first timing instruction. The first timing instruction may correspond to the first evacuation route. The first timing instruction may be based at least in part on the first venue condition data. The method may further include providing the first evacuation route and the first timing instruction to the first user.

Some embodiments of the present disclosure can be illustrated as a system for performing the method described above.

Some embodiments of the present disclosure can be illustrated as a computer program product for performing the method described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to venue evacuation; more particular aspects relate to guidance for facilitating venue evacuation. While the present disclosure is not necessarily limited to such applications, various aspects of the disclosure may be appreciated through a discussion of various examples using this context.

Unsafe conditions may arise when large groups of people must evacuate a venue. Conditions may be especially unsafe when large groups of people must evacuate under exigent circumstances, such as in the presence of a fire or some other life-threatening danger. Such circumstances may create a noisy, chaotic environment in which it may be difficult or impossible for people to obtain accurate and current information regarding where to go and the safest time to move to a new location. Furthermore, those attempting to evacuate may have unique needs that may present additional challenges to evacuating safely. For example, it may not be safe for a person who is present at a venue with a baby or a small child to follow the same evacuation path as a person who is present by themselves. Similarly, an evacuation path for a person without a disability may not be practical for a person using a wheelchair.

To address these and other problems, embodiments of the present disclosure include a system and method for generating a personalized venue evacuation ("PVE") plan that may include a set of current evacuation instructions that are tailored to a user's needs.

Embodiments of the present disclosure may include a PVE system that may generate and provide a PVE plan. The PVE plan may include a PVE route, or a set of instructions regarding where and/or how to evacuate. The PVE plan may also include a PVE timing instruction, or an instruction regarding a preferred time to take an action.

In generating a PVE plan, the PVE system may obtain a first data set that includes personal data of a user. A user may be a visitor of a venue who uses the PVE system. Personal data may include a user's location and information regarding the user's mobility (e.g., information regarding the user's form of movement and/or pace of movement). The PVE system is configured to collect such personal data after informing a user of the collection and receiving user consent to perform the collection, such as via a user interface of mobile device application software. The PVE system is additionally configured to allow users to verify personal data collected by the PVE system and to allow users to deny consent to collect their personal data. Using collected personal data, the PVE system may generate an evacuation plan that may consider factors such as a user's proximity to a dangerous condition, such as a fire, and whether the user may require a wheelchair accessible evacuation route. The PVE system may also obtain venue characteristic data, or information about the structure, layout, or configuration of the venue, so that may locate exits and/or identify obstacles to evacuation. The PVE system may also obtain, in real-time, venue condition data, or information about dynamic conditions at the venue, such as crowd movement patterns within the venue and adjacent areas outside of the venue, an arrival of first responders, crowd bottlenecks, temperature changes, air quality, and weather conditions. Venue condition data may be monitored by a set of recording devices and a set of sensing devices at the venue. By obtaining venue condition data and personal data, the PVE system may accurately determine a safe time and route for a user to evacuate according to the user's abilities, location, and circumstances.

In some embodiments, the PVE system may monitor one or more venue conditions during a variety of time periods so that it may use artificial intelligence and machine learning techniques predict one or more venue conditions. For example, in some embodiments the PVE system may monitor a flow rate and a flow pattern of a crowd during a non-emergency evacuation of a venue and use that information to predict a flow rate and a flow pattern of a crowd during an emergency evacuation of the venue. In some embodiments, the PVE system may monitor a flow rate and a flow pattern of a crowd during a first emergency evacuation of a venue and use that information to predict a flow rate and a flow pattern of a crowd during a second emergency evacuation of the venue. By monitoring venue conditions during emergency and non-emergency time periods, the PVE system may continuously develop its analyses of venue conditions and continuously improve its prediction accuracy.

In some embodiments, a PVE system at a first venue may share a set of PVE plans with a PVE system at a second venue. Such sharing may allow multiple PVE systems to benefit from a set of PVE plans that may have been highly efficient at the first venue. The sharing may also allow effective PVE plans to be developed by multiple PVE systems over time.

Figure 1:
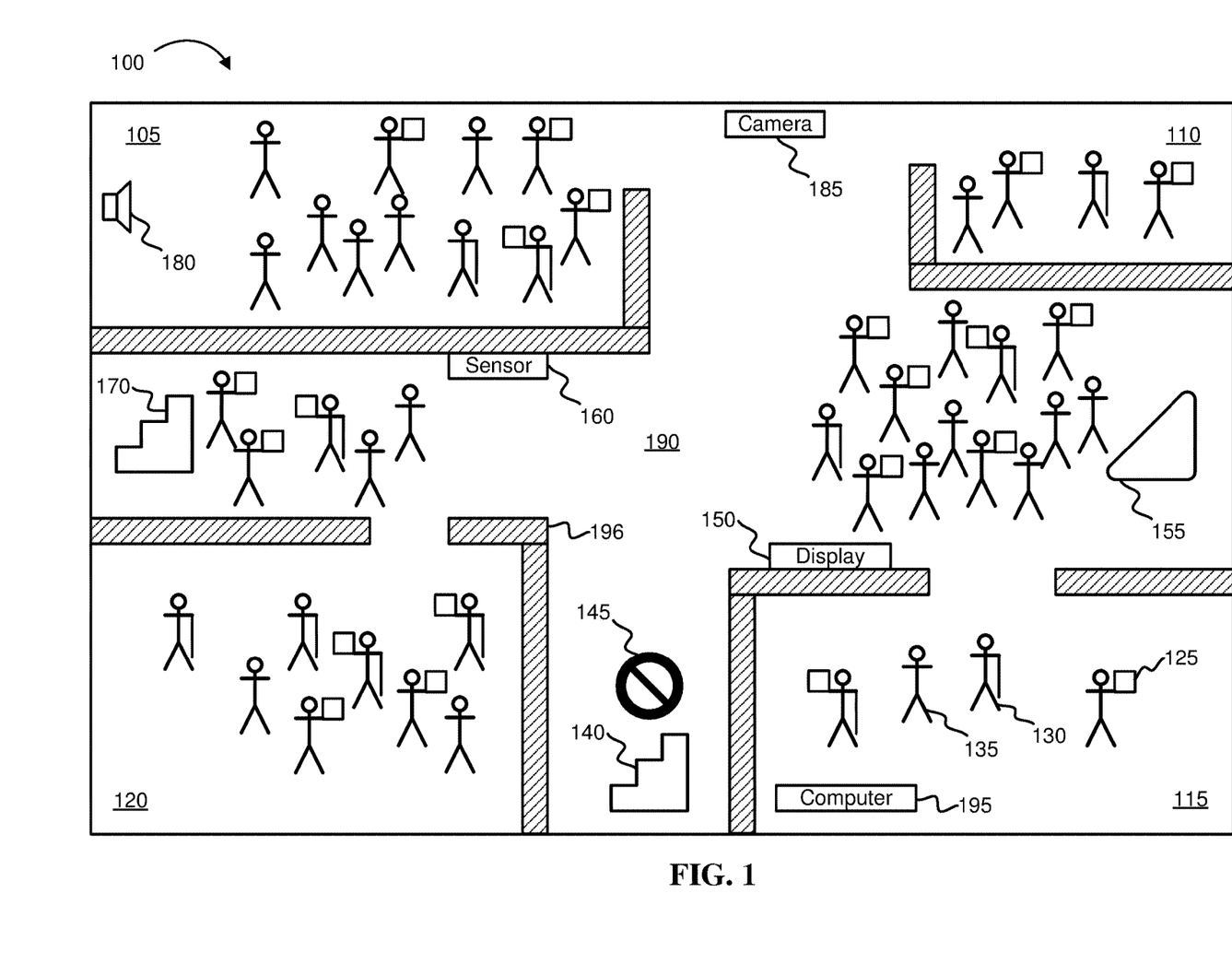
FIG. 1 depicts a venue that includes a personalized venue evacuation system, in accordance with embodiments of the present disclosure.

Turning to the figures, FIG. 1 illustrates an example venue 100 that includes a PVE system according to an embodiment of the present disclosure. Venue 100 may be one of a variety of sites attended by visitors, such as an office building, stadium, concert hall, school building, school campus, shopping mall, or an urban area. Visitors may include users of the PVE system. Venue 100 may include a first area 105, a second area 110, a third area 115, and a fourth area 120. Venue 100 may also include one or more passageways 190 and one or more walls or barriers 196. Venue 100 may be populated by a number of visitors 135 and/or visitors having a special mobility attribute 130. A special mobility attribute may be a characteristic that may affect the visitor's form of movement and/or pace of movement. For example, a special mobility attribute may include the use of an assistive device such as a cane, crutches, or a wheelchair. A special mobility attribute may also include the use of a child carrier or a stroller.

To facilitate evacuation of the venue 100, the venue 100 may include a set of audio devices 180, a set of recording devices 185, a set of sensing devices 160, a set of displays 150, and a set of computing devices 195. Audio devices 180 may include a set of speakers capable of emitting verbal messages or sounds within an audible range. Recording devices 185 may include cameras that may capture still and/or moving images and/or sound recordings of the venue and the visitors present at the venue. Sensing devices 160 may include a variety of devices that may capture information about environmental conditions at the venue, such as temperature, air quality, pressure, motion, and position (e.g. beacon technology capable of monitoring a position of a mobile device, such as a smart phone). Displays 150 may include screens or projections capable of presenting visual information, such as alphanumeric text or images. Computing devices 195 may include a device, such as that shown in FIG. 4, that is capable of communicating with other computing devices 195, the set of displays 150, the set of sensors 160 (i.e., sensing devices 160), the set of recording devices 185, and the set of audio devices 180. Computing devices 195 may also communicate with a set of personal displays 125 (e.g. tablets, mobile phones, and smart watches) that are worn or carried by visitors 135 or visitors having a special mobility attribute 130. Computing devices 195 may be located at venue 100 or at a remote location.

Computing devices 195 may monitor one or more venue conditions using recording devices 185 and/or sensing devices 160. Through such monitoring, the computing devices 195 may acquire information that may be used to predict evacuation conditions (i.e., venue conditions during an evacuation), such as where crowd bottlenecks may form, and evacuation metrics (e.g., a maximum number of moving visitors that may safely populate a particular stairwell, a minimum evacuation time, or a level of difficulty associated with an evacuation route). The monitoring may occur during a time period when a majority of the visitors present at the venue intend to remain at the venue (e.g., a time period during a venue event or during an ordinary course of business activity at the venue), also referred to herein as a "non-evacuation period"; during a time period when a majority of the visitors intend to exit the venue under non-exigent circumstances (e.g., a time period after a venue event has ended or at the close of business hours), also referred to herein as a "non-emergency evacuation period"; and during a time period when a majority of the visitors intend to rapidly exit the venue under exigent circumstances (e.g., a time period when visitors are exposed to a dangerous condition, such as a fire), also referred to herein as a "emergency evacuation period."

For example, in some embodiments, during a non-evacuation period, video cameras and motion sensors may capture images and motion data of visitors, and computing devices may analyze the images and motion data to detect and characterize special mobility attributes. For example, computing devices may apply artificial intelligence and machine learning processes to determine that a visitor is pushing a stroller and to predict both an average pace of motion and a maximum pace of motion for such a visitor during an evacuation period. In some embodiments, during a non-emergency evacuation period, video cameras and motion sensors may collect data regarding the occupancy of venue areas and flow patterns of visitors in passageways and on stairways and escalators. Computing devices may analyze such data to determine where crowd bottlenecks have developed and make predictions such as a maximum pace that a group of visitors may progress on a crowded stairway, a minimum time in which the venue may be completely evacuated by all visitors, or a crowd flow pattern, during an emergency evacuation period. Thus, by monitoring venue conditions at one or more time periods, the PVE system may train itself to predict a number of evacuation conditions and evacuation metrics during the same time periods or during different time periods. Those predictions may be used by the PVE system to generate personalized venue evacuation plans that may be used for evacuation during non-evacuation periods, non-emergency evacuation periods, or emergency evacuation periods.

For example, in some in some embodiments, during an emergency evacuation of venue 100, a dangerous condition 145, such as a fire, may be present near stairwell 140. Dangerous condition 145 may be detected by sensing devices 160 (e.g., smoke detectors and temperature sensors). To safely and efficiently evacuate visitors, computing devices 195 may broadcast a message from an audio device 180 to visitors in the first area 105 requesting that they stay low to the ground and remain where they are because firefighters will arrive in five minutes. In some embodiments, computing devices 195 may command a display 150 to show a bright green arrow pointing toward escalator 155, indicating that visitors in passageway 190 should evacuate in that direction to move to safety. Computing devices 195 may continue directing visitors toward escalator 155 until sensing devices 160 detect that a predetermined threshold of visitors who can safely use the escalator 155 has been reached or until computing devices 195 predict that a bottleneck will form if more visitors are directed toward the escalator. In some embodiments, computing devices 195 may send a map and an instruction to each personal display 125 in third area 115. Such map and instruction may indicate that visitors in the third area 115 should wait until a clock displayed in the instruction counts down to zero and then move as quickly as possible to second area 110. In some embodiments, computing devices 195 may send an instruction to the personal display 125 of a visitor with a special mobility attribute (e.g., the visitor walks with a cane) in fourth area 120. The instruction may indicate that the visitor may evacuate the venue more quickly by waiting five minutes and then moving to escalator 155, as opposed to attempting to immediately evacuate using stairway 170. The personalized venue evacuation plans provided by computing devices 195 may be generated and updated based on data acquired by sensing devices 160 and recording devices 185.

In some embodiments, the PVE system may generate PVE plans on a continuous or intermittent basis during an evacuation period and/or during a non-evacuation period. Thus, visitors may access a PVE plan at their discretion (e.g., a visitor may access a PVE plan using application software on a mobile device).

Figure 2:
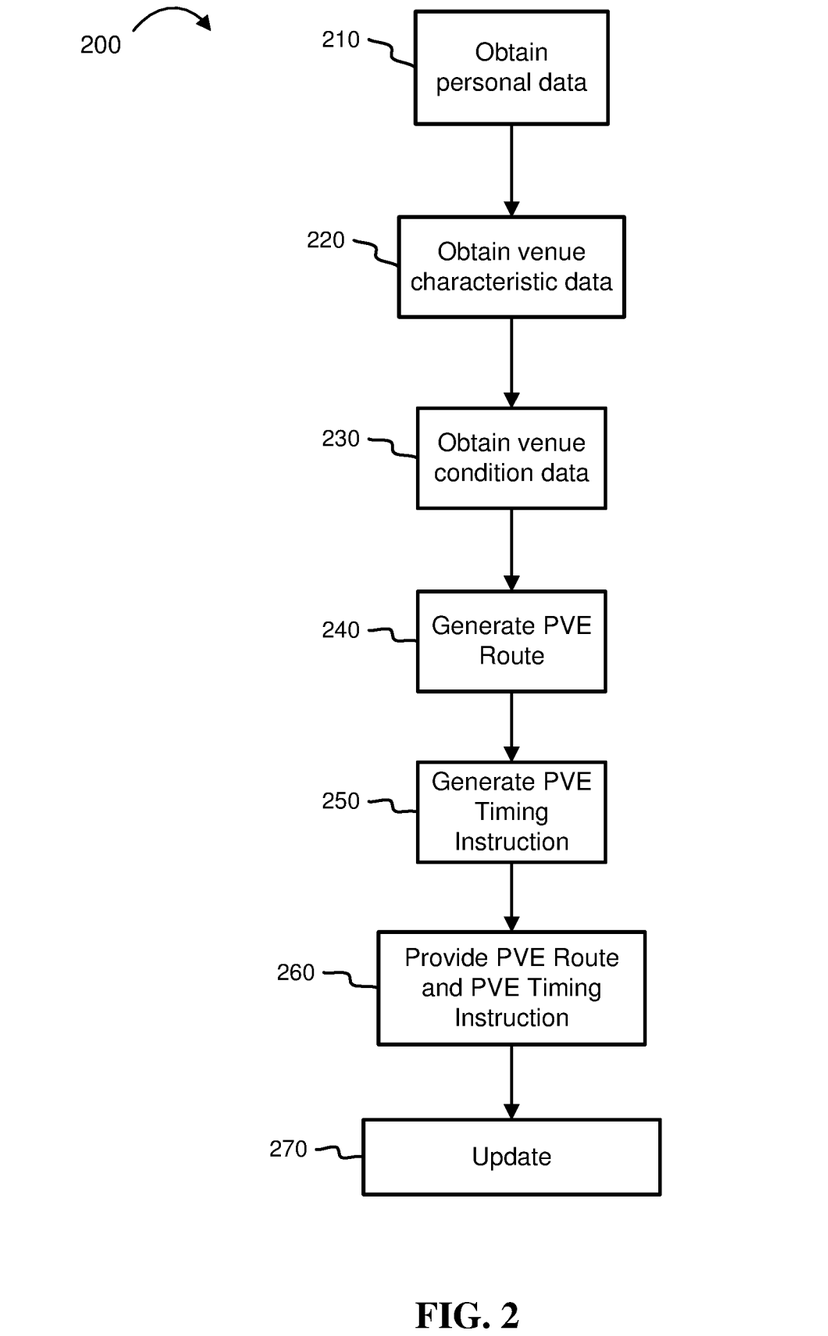
FIG. 2 depicts a flowchart of an example method for providing a personalized venue evacuation plan, in accordance with embodiments of the present disclosure.

FIG. 2 illustrates an example method 200 for providing a personalized venue evacuation plan. In step 210, a PVE system may obtain personal data about visitors to a venue. The PVE system is configured to collect such personal data after informing visitors of the collection and receiving visitor consent to perform the collection. The personal data may include information such as appearance, mobility (e.g. a person's form of movement and/or pace of movement), and location. The PVE system is additionally configured to allow visitors to verify personal data collected by the PVE system and to allow visitors to deny consent to collect their personal data (e.g., by submitting preferences via mobile device application software). In some embodiments, personal data may be collected by sensing devices and recording devices of the PVE system. In some embodiments, visitors may share personal data with the PVE system via an interface such as a website or mobile device application software. For example, in some embodiments, a visitor may create a profile that may include information pertinent to the visitor's mobility and/or fitness (e.g., a visitor may include that they are using a wheelchair or a walker, that they are athletic with no physical impairments, or that they have a heart condition). A visitor may then share the profile with the PVE system so that the visitor may receive, via a personal display (e.g. a tablet, mobile phone, or smart watch), a personalized venue evacuation plan that is based on the visitor's profile. For example, a visitor who shares a profile that states the visitor is using a wheelchair may receive a personalized venue evacuation plan that directs the visitor along an evacuation path that may be wheelchair accessible.

In step 220, the PVE system may obtain venue characteristic data. Venue characteristic data may include information about one or more characteristics of a venue, such as information about the structure, layout, or configuration of the venue. Venue characteristic data may include one or more floorplans or building specifications. In some embodiments, the PVE system may obtain venue characteristic data from a computing device (e.g. a database of a server) or from a recording device at the venue.

In step 230, the PVE system may obtain venue condition data. The venue condition data may include information captured by recording devices and sensing devices at the venue, such as a current occupancy of a venue area, a size and flow rate of a moving crowd, or a location of a spreading fire. In some embodiments, the venue condition data may include data from operational teams, such as venue staff, medical professionals, law enforcement, and firefighters. For example, venue staff may input, using a computing device, a message into the PVE system stating that evacuation buses will arrive at a south exit in 15 minutes. In another example, a police officer may upload, using a mobile phone, a message that a threat has been detained, and therefore, all exits may be used for evacuation. The PVE system may obtain venue condition data continuously or intermittently.

In step 240, the PVE system may generate a PVE route. The PVE route may include a set of instructions regarding where and/or how a visitor may position himself/herself for safety. For example, the PVE route may include an instruction to move from one location to another, an instruction to stay close to the ground or away from a window, or an instruction to remain in a particular location.

In some embodiments, the PVE system may generate a PVE route based on one or more of obtained personal data, obtained venue characteristic data, and obtained venue condition data. The PVE route may be updated continuously or intermittently to account for changes in obtained data. For example, in some embodiments, during an emergency evacuation, a PVE system may initially instruct a group of visitors to use a set of escalators to evacuate a venue, based on the set of escalators being operational and a low number of visitors detected near the set of escalators. However, at a later time, the set of escalators may stop operating due to an excessive number of visitors using them at once. As a result, sensing devices and/or recording devices near the set of escalators may indicate to the PVE system that a flowrate of the group of visitors in that area has changed, causing a bottleneck of visitors there. In response, the PVE system may begin instructing visitors to use one or more stairways to evacuate the venue.

In step 250, the PVE system may generate a PVE timing instruction based on obtained personal data, obtained venue characteristic data, and/or obtained venue condition data. The PVE timing instruction may be an instruction regarding a preferred time when a visitor should take an action. The PVE timing instruction may correspond to a PVE route. For example, in some embodiments, a PVE system may recognize, based on a visitor profile shared with the PVE system, that a visitor is carrying a small child in a child carrier. The PVE system may predict, based on previously monitored visitor movements, that the visitor using the child carrier can move at a maximum rate of approximately 6 mph. Considering that rate as well as a set of monitored conditions at the venue, the PVE system may determine that it would be safer for the visitor using the child carrier to wait approximately five minutes before proceeding to a stairwell.

In some embodiments, the PVE timing instruction may include an estimated time to complete a particular action in a PVE route. For example, in some embodiments, a PVE route may include a first instruction for a visitor to walk to a stairway, followed by a second instruction for the visitor walk down 10 flights of stairs. In this example, corresponding timing instructions generated by the PVE system may indicate, based on mobility information provided in the visitor's profile, that the first instruction should take the visitor 10 minutes to complete, and the second instruction should take the visitor 15 minutes to complete.

In some embodiments, the PVE system may provide more than one timing instruction to be considered by the user, allowing the user to choose the timing of the user's evacuation accordingly. Using the example above, the PVE system may indicate that in view of venue condition data (e.g. a crowded stairwell), the second instruction should take the visitor 30 minutes to complete if the visitor takes action now, but the second instruction should take the visitor 15 minutes to complete if the visitor waits 10 minutes, as the PVE system has predicted that the stairwell will no longer be crowded in 10 minutes.

By providing a timing instruction, the PVE system may provide efficient evacuation instructions by accounting for dynamic venue conditions, such as changing flow patterns of crowds or a moving danger. Furthermore, the timing instruction may facilitate safe evacuation, as the PVE system may account for a visitor's mobility attributes as well as dynamic venue conditions to provide an evacuation plan that is tailored to the visitor's abilities.

In step 260, the PVE system may provide a PVE plan, such as a PVE route and a corresponding PVE timing instruction. In some embodiments, a PVE plan may be based on a visitor's profile and it may be provided to that visitor's personal display, such as to the visitor's smart phone (e.g., a PVE system may provide, to a wheelchair-using visitor's smart phone, a wheelchair-accessible PVE plan). In some embodiments, a PVE plan may be based on a visitor's location, and it may be provided to a set of personal displays in that location (e.g., a PVE system may provide, to a set of mobile phones on a third floor of a building, an instruction to move into a particular meeting room). In some embodiments, a PVE plan may include a map or a set of images. In some embodiments, a PVE plan may include shapes such as arrows and/or alphanumeric text (e.g., a PVE plan may include text, such as "Move forward 50 meters and then turn right into the stairway."). In some embodiments, a PVE plan may include spoken instructions and/or other sounds (e.g., a periodic beeping sound from a visitor's smart phone whose frequency increases if the visitor moves toward a dangerous condition and decreases if the visitor moves away from a dangerous condition). The PVE system may provide updated PVE plans according to changed conditions.

In step 270, the PVE system may update obtained data and a corresponding PVE plan. For example, in some embodiments, a PVE system may obtain a message from a venue staff member indicating that an evacuation bus has arrived at a north exit. Accordingly, the PVE system may begin providing updated PVE plans that direct visitors toward the north exit.

Figure 3:
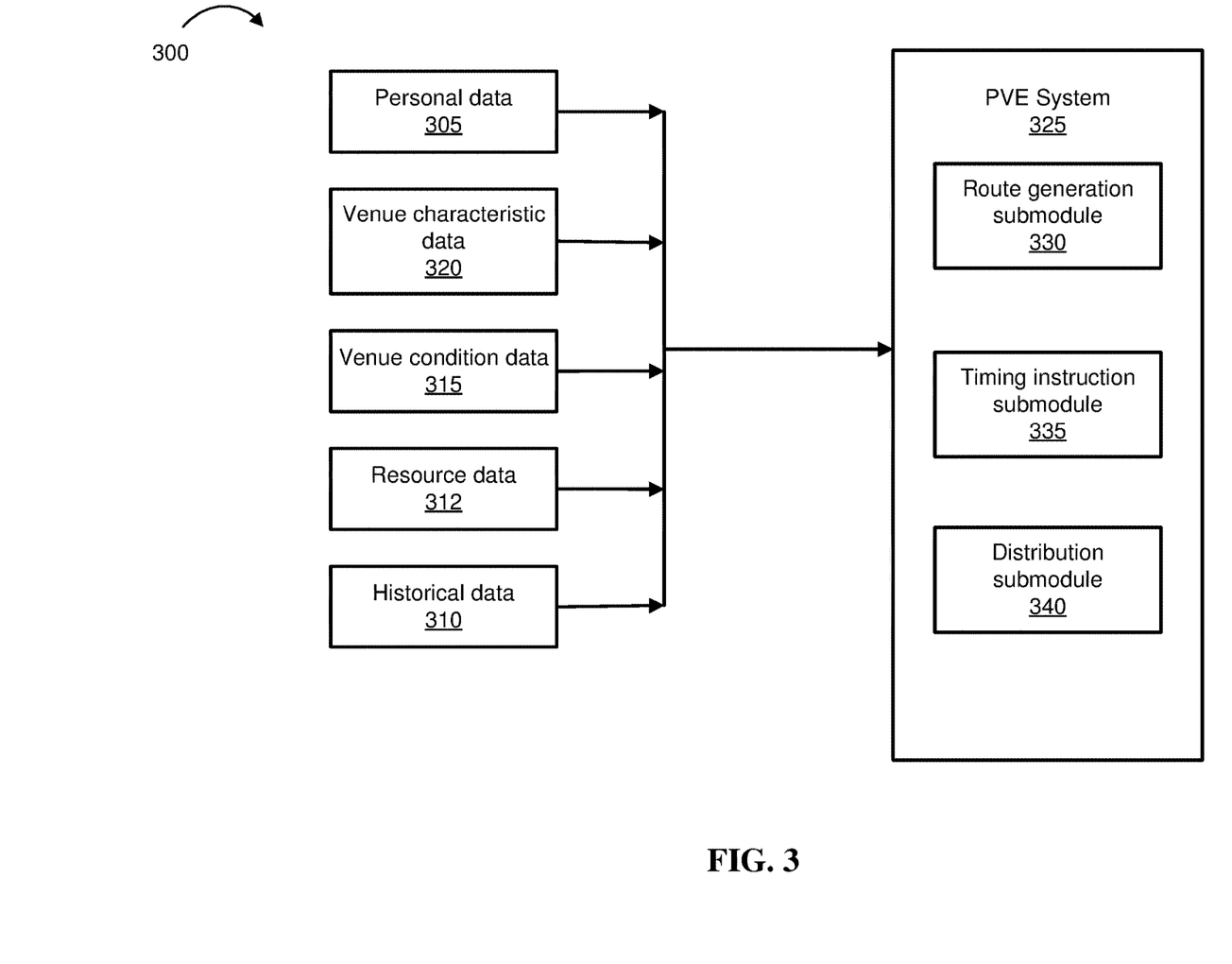
FIG. 3 depicts a system block diagram of a personalized venue evacuation system, in accordance with embodiments of the present disclosure.

FIG. 3 illustrates a block diagram 300 of an example PVE system, according to embodiments of the present disclosure. Block diagram 300 illustrates data that may be obtained by the PVE system. Such data may include personal data 305, venue characteristic data 320, venue condition data 315, resource data 312, and/or historical data 310. In some embodiments, personal data 305 may include information relevant to mobility, such as a health condition, or location information. The PVE system may obtain personal data 305 from sensing devices, recording devices, and/or a visitor profile. Venue characteristic data 320 may include information about a venue such as a floorplan or a maximum capacity. The PVE system may obtain venue characteristic data 320 from a computing device, such as a server storing venue data, or from sensing devices and/or recording devices at the venue. Venue condition data 315 may include information about dynamic conditions at the venue, such as information about crowd movement, the arrival of first responders, bottlenecks, temperature changes, air quality, and weather conditions. The PVE system may obtain venue condition data 315 from sensing devices and/or recording devices at the venue and/or information provided by operational teams or the visitors themselves.

Resource data 312 includes information that may be pertinent to an emergency condition, such as health risks, first-aid procedures, and engineering information. For example, in some embodiments, resource data 312 may include an amount of time that a person of average health may be exposed to a smoke-filled environment before experiencing debilitating symptoms. In some embodiments, resource data 312 may include an approximate amount of time that a maximum capacity of a walkway or elevator may be exceeded before a critical failure occurs. The PVE system may obtain resource data 312 from one or more sources such as one or more servers that are accessible to the PVE system via an Internet connection. The PVE system may use a resource data 312 to determine one or more factors such as an amount of time a visitor may remain in a particular area under certain conditions (e.g., an amount of time a visitor may safely remain in a high-temperature room). The PVE system may also use a resource data to predict whether a dangerous condition may occur (e.g. whether directing a group of visitors to a particular exit may cause a structural failure of a walkway due to overloading).

Historical data 310 may include previously obtained personal data 305, venue characteristic data 320, and/or venue condition data 315. Historical data 310 may also include information such as previous PVE plans, previous data analysis, and/or previous predictions regarding a venue evacuation. Historical data 310 may be categorized and stored in one or more databases that are accessible to one or more PVE systems.

For example, historical data 310 may include a set of PVE plans that were provided at a previous time and at a different venue (a first office building) and that provided a highly efficient complete evacuation of the first office building (e.g. all visitors were safely evacuated within a required timeframe). The set of PVE plans may be stored in a database under one or more categories, such as "timely" evacuation, "safe" evacuation, or "successful" office building evacuation. In some embodiments, a PVE system of the first office building may share the set of PVE plans with a second office building. In another example, historical data 310 may include a set of correlations developed through machine learning at a first venue that proved highly effective for predicting bottlenecking trends. The set of correlations may be shared with a PVE system at a second venue to improve bottlenecking predictions by the PVE at the second venue. By sharing and using historical data 310, PVE systems of the present disclosure may, in effect, "collaborate" to develop highly effective PVE plans over time. Also, the sharing of historical data 310 may allow a newer venue to more quickly develop an effective PVE system, as the PVE system at the newer venue may benefit from machine learning correlations that have been developed by more established PVE systems, rather than developing machine learning correlations from scratch.

Figure 4:
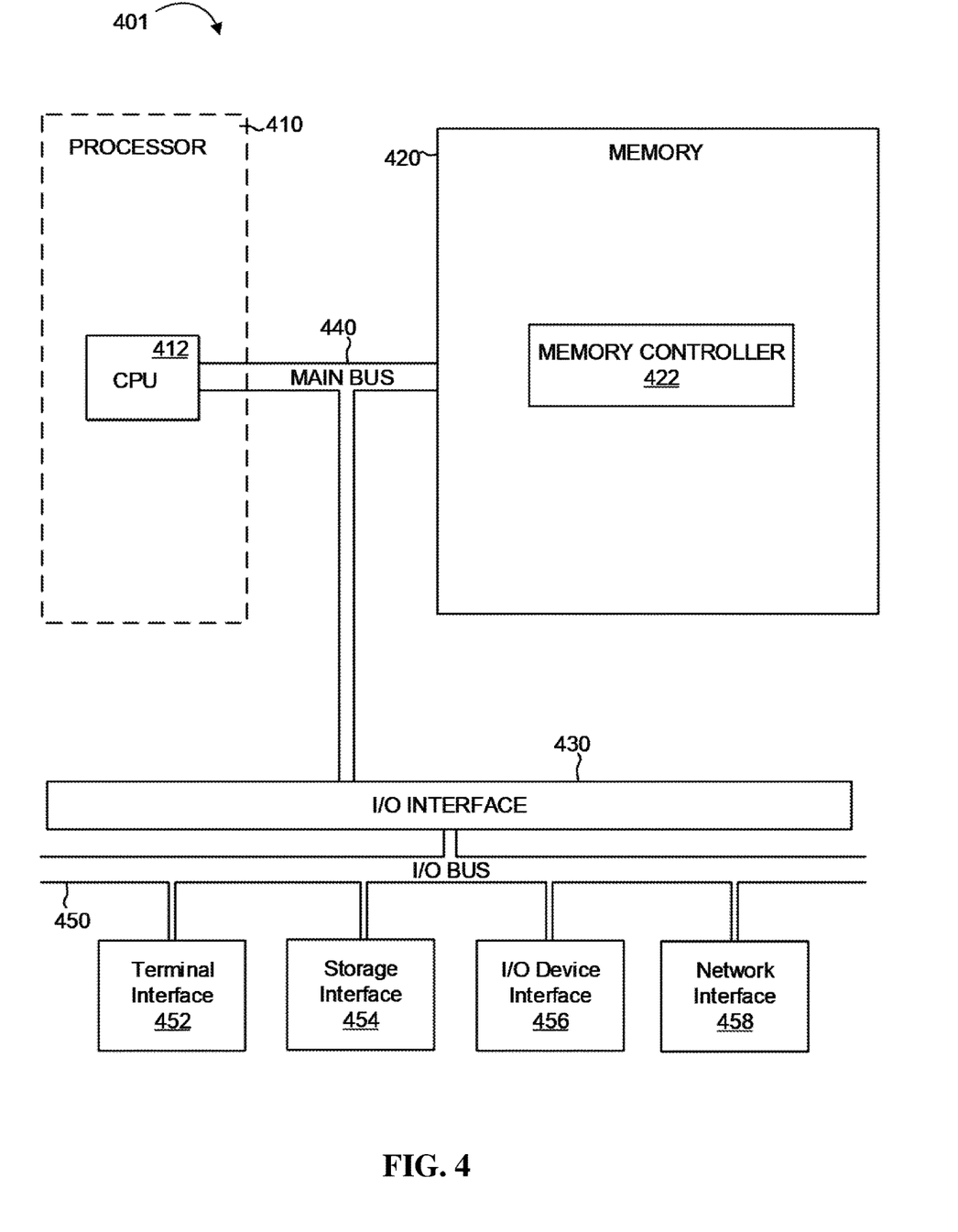
FIG. 4 depicts the representative major components of a computer system that may be used in accordance with embodiments of the present disclosure.

PVE system 325 may include one or more computers that may be identical or substantially similar to the computer presented in FIG. 4. In some embodiments, PVE system 325 may include a set of discrete submodules, such as a route generation submodule 330, a timing instruction submodule 335, and a distribution submodule 340. In some embodiments, the functions of such submodules may be integrated, rather than discrete.

The route generation submodule 330 may generate PVE plans by analyzing obtained data, predicting evacuation conditions and metrics, and ranking evacuation routes based on metrics such as safety and efficiency.

For example, a PVE system may obtain a profile of a first visitor indicating that the visitor is pushing a stroller. The PVE system may also obtain venue characteristic data such as a length, width, and velocity of an escalator, as well as a length and width of a staircase. The PVE system may also obtain venue condition data such as an approximate crowd size near the first visitor. The PVE system may also obtain historical data such as statistical information regarding a percentage of people who rushed to a central set of escalators during a previous evacuation and a percentage of people who rushed to a staircase during a previous evacuation.

In generating a PVE plan for the first visitor, the PVE system may use the obtained data to predict a percentage of the crowd that may rush toward the set of escalators and a percentage of the crowd that may rush toward the staircase. The PVE system may also use the obtained data to predict an amount of time and a degree of difficulty the first visitor may encounter by evacuating using the escalators as compared to evacuating using the staircase. Based on those predictions, the PVE system may assign a first priority for the first visitor to evacuate using the staircase and a second priority for the first visitor to evacuate using the escalators.

The timing instruction submodule 335 may generate a timing instruction (e.g. a preferred time for a visitor to take an action) by analyzing obtained data and predicted evacuation conditions and metrics. A timing instruction may be based on factors such as potential exposure to one or more dangerous conditions, potential bottlenecking, an estimated time of arrival of first responders, and health conditions of a visitor shared in a visitor profile.

For example, in some embodiments, a PVE system may provide a PVE plan to a group of visitors that are confined to a first area of a burning building. The building may include an evacuation location that will be inaccessible until it is opened by firefighters who are en route to the building (this venue condition data may be provided to the PVE system by operational teams). In the first area, the group of visitors is exposed to a minimum amount of heat and smoke from the building fire (this venue condition data may be provided to the PVE system by a set of recording devices and sensors at the venue). In a second area leading to the evacuation location, exposure to heat and smoke from the fire would be significantly higher (this venue condition data may also be provided to the PVE system by a set of recording devices and sensors at the venue or by operational teams). Also, in the second area, the amount of smoke present would likely cause a visitor to experience debilitating symptoms within 15 minutes (this resource data may be provided to the PVE system by a database accessible to the PVE system).

In generating a PVE plan for the group of visitors, the timing instruction submodule 335 may consider factors such as the expected arrival time of firefighters, a potential danger to a visitor of remaining in the first area, and a potential danger to a visitor of moving to the second area. In consideration of those factors, the timing instruction submodule may issue a timing instruction such that the group of visitors would begin moving toward the evacuation location 5 minutes before the expected arrival time of the firefighters. The PVE system may determine that such timing may provide the highest likelihood of a safe emergency evacuation.

The distribution submodule 340 may control the distribution of PVE plans to audio devices and displays. Such distribution may include coordinating PVE plans according to particular groups of visitors and their locations. For example, in some embodiments, to coordinate an efficient evacuation, the distribution submodule may distribute a first set of instructions to visitors in a first area to remain where they are for a period of time, while distributing a second set of instructions to visitors in a second area to move to a third location. In some embodiments, the distribution submodule 340 may coordinate PVE plans such that a group, such as a family, may evacuate together and/or reunite during an evacuation. The distribution submodule may also output historical data to other PVE systems and/or one or more servers.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401— including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
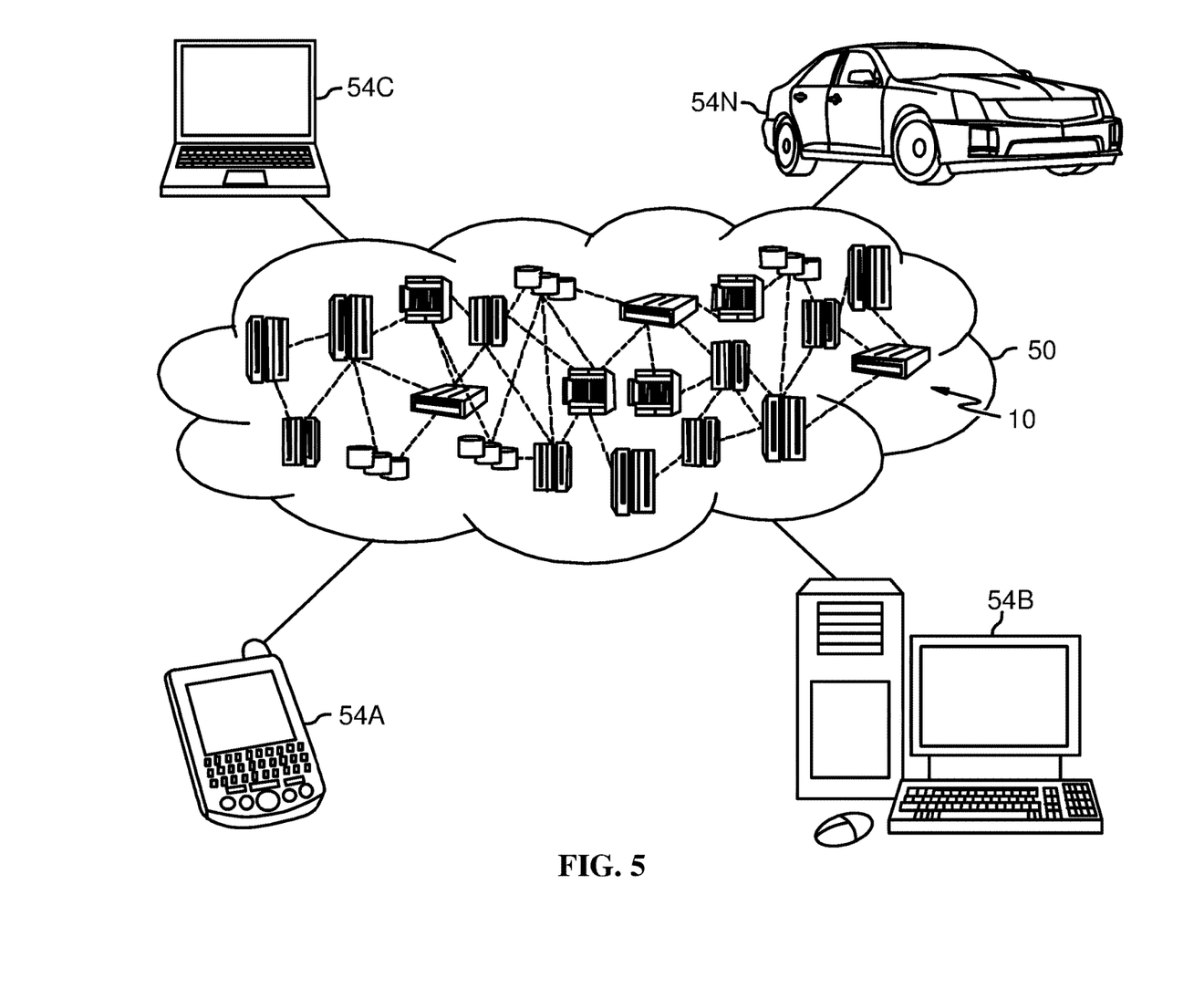
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
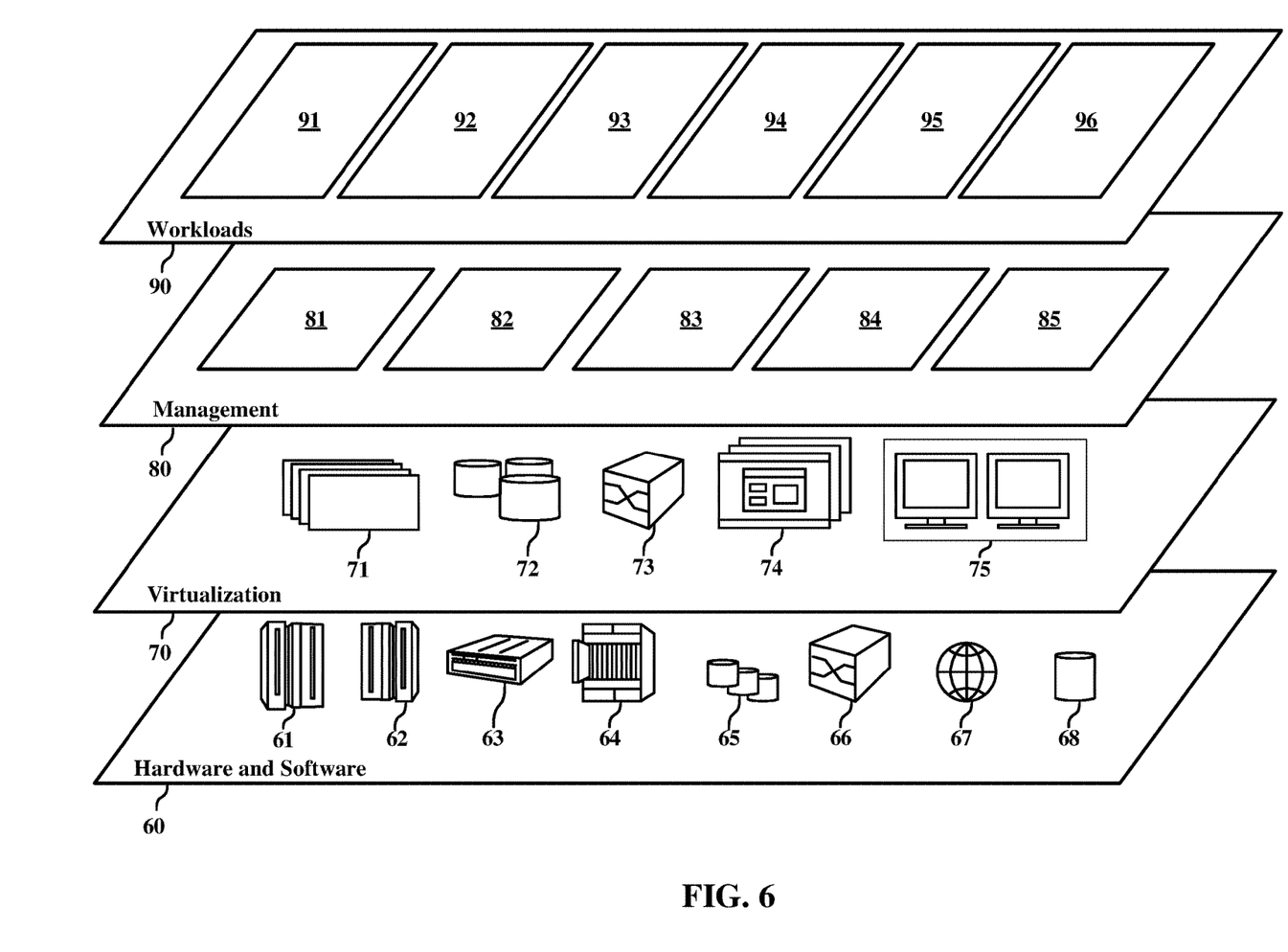
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal venue evacuation logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining, using a computing device, a first data set of a first user present at a venue;
    obtaining, using the computing device, venue characteristic data corresponding to a set of characteristics of the venue;
    obtaining, using the computing device, first venue condition data corresponding to a first set of venue conditions;
    generating, using the computing device, a first evacuation route based at least in part on the first data set;
    generating, using the computing device, a first timing instruction corresponding to the first evacuation route and based at least in part on the first venue condition data;
    providing the first evacuation route and the first timing instruction to the first user;
    monitoring, using the computing device, a new set of venue conditions,
    wherein the monitoring occurs during a first non-emergency evacuation period at the venue, the first non-emergency evacuation period not associated with an emergency evacuation period; and
    predicting, using the computing device, based at least in part on the monitoring, a predicted set of venue conditions,
    wherein the generating the first evacuation route is based at least in part on the predicted set of venue conditions;
    predicting, using the computing device, a second set of venue conditions;
    generating, using the computing device, a second timing instruction corresponding to the first evacuation route and based at least in part on the second set of venue conditions; and
    providing the second timing instruction to the first user; and
    obtaining, using the computing device, historical data corresponding to a fourth evacuation route at a second different venue;
    wherein:
    the predicting the second set of venue conditions is based at least in part on the historical data; and
    the first timing instruction and the second timing instruction comprise instructions to the first user regarding a preferred time to take an action.

2. The method of claim 1, further comprising:
    updating, using the computing device, the first venue condition data, resulting in updated first venue condition data;
    generating, using the computing device, a second evacuation route based at least in part on the updated first venue condition data; and
    providing the second evacuation route to the first user.

3. The method of claim 1, wherein the obtaining the first data set includes obtaining mobility information corresponding to the first user.

4. The method of claim 3, wherein the mobility information is included in a user profile.

5. The method of claim 1, wherein the obtaining the first data set includes detecting a special mobility attribute of the first user.

6. The method of claim 1, further comprising:
obtaining, using the computing device, historical data corresponding to a third evacuation route at a first different venue; and
wherein the generating the first evacuation route is based at least in part on the historical data.

7. A system comprising:
a processor; and
a memory in communication with the processor, the memory containing program instructions that, when executed by the processor, are configured to cause the processor to perform a method, the method comprising:
obtaining a first data set of a first user present at a venue;
obtaining venue characteristic data corresponding to a set of characteristics of the venue;
obtaining first venue condition data corresponding to a first set of venue conditions;
generating a first evacuation route based at least in part on the first data set;
generating a first timing instruction corresponding to the first evacuation route and based at least in part on the first venue condition data;
providing the first evacuation route and the first timing instruction to the first user;
monitoring a new set of venue conditions,
wherein the monitoring occurs during a first non-emergency evacuation period at the venue, the first non-emergency evacuation period not associated with an emergency evacuation period; and
predicting, based at least in part on the monitoring, a predicted set of venue conditions,
wherein the generating the first evacuation route is based at least in part on the predicted set of venue conditions;
predicting a second set of venue conditions;
generating a second timing instruction corresponding to the first evacuation route and based at least in part on the second set of venue conditions; and
providing the second timing instruction to the first user; and
obtaining historical data corresponding to a fourth evacuation route at a second different venue;
wherein:
the predicting the second set of venue conditions is based at least in part on the historical data; and
the first timing instruction and the second timing instruction comprise instructions to the first user regarding a preferred time to take an action.

8. The system of claim 7, wherein the program instructions, when executed by the processor, are configured to cause the processor to perform the method, further comprising:
updating the first venue condition data, resulting in updated first venue condition data;
generating a second evacuation route based at least in part on the updated first venue condition data; and
providing the second evacuation route to the first user.

9. The system of claim 7, wherein the obtaining the first data set includes obtaining mobility information corresponding to the first user.

10. The system of claim 9, wherein the mobility information is included in a user profile.

11. The system of claim 7, wherein the program instructions, when executed by the processor, are configured to cause the processor to perform the method, further comprising:
monitoring a third set of venue conditions,
wherein the monitoring the third set of venue conditions occurs during a first emergency evacuation period at the venue;
predicting, based at least in part on the monitoring the third set of venue conditions, a fourth set of venue conditions,
wherein the fourth set of venue conditions corresponds to a second emergency evacuation period at the venue; and
wherein the generating the first evacuation route is based at least in part on the fourth set of venue conditions.

12. The system of claim 7, wherein the obtaining the first data set includes obtaining a health condition of the first user, and
wherein the first timing instruction is based at least in part on the health condition.

13. The system of claim 2, wherein the predicting the second set of venue conditions comprises predicting a degree of difficulty associated with the first evacuation route.

14. The system of claim 7, the method further comprising:
predicting a structural failure at the venue; and
wherein the first timing instruction is based at least in part on the predicting.

15. A computer program product, the computer program product comprising a computer readable storage medium having program instructions embodied therewith, the program instructions executable by a computer to cause the computer to:
obtain a first data set of a first user present at a venue;
obtain venue characteristic data corresponding to a set of characteristics of the venue;
obtain first venue condition data corresponding to a first set of venue conditions;
generate a first evacuation route based at least in part on the first data set;
generate a first timing instruction corresponding to the first evacuation route and based at least in part on the first venue condition data;
provide the first evacuation route and the first timing instruction to the first user;
monitor a new set of venue conditions,
wherein the monitoring occurs during a first non-emergency evacuation period at the venue, the first non-emergency evacuation period not associated with an emergency evacuation period; and
predict, based at least in part on the monitoring, a predicted set of venue conditions,
wherein the generating the first evacuation route is based at least in part on the predicted set of venue conditions
predict a second set of venue conditions;
generate a second timing instruction corresponding to the first evacuation route and based at least in part on the second set of venue conditions; and
provide the second timing instruction to the first user; and
obtain historical data corresponding to a fourth evacuation route at a second different venue;
wherein:
the prediction of the second set of venue conditions is based at least in part on the historical data; and
the first timing instruction and the second timing instruction comprise instructions to the first user regarding a preferred time to take an action.

16. The computer program product of claim 15, wherein the obtaining the first data set includes detecting a special mobility attribute of the first user.

17. The computer program product of claim 15, wherein the program instructions, when executed by the computer, are configured to further cause the computer to:
   obtain historical data corresponding to a third evacuation route at a first different venue; and
   wherein the generating the first evacuation route is based at least in part on the historical data.

* * * * *